(12) United States Patent
Shiue

(10) Patent No.: US 6,450,408 B2
(45) Date of Patent: Sep. 17, 2002

(54) DRAWABLE SUBSCRIBER IDENTITY MODULE CARD HOLDER

(75) Inventor: Jih-Jonq Shiue, Tucheng (TW)

(73) Assignee: High Tech Computer Coproration, Taoyuan (TW)

( * ) Notice: Subject to any disclaimer, the term of this patent is extended or adjusted under 35 U.S.C. 154(b) by 0 days.

(21) Appl. No.: 09/810,444

(22) Filed: Mar. 19, 2001

(30) Foreign Application Priority Data

Jul. 20, 2000 (TW) .......................................... 89114571 A

(51) Int. Cl.$^7$ ............................................... G06K 19/06

(52) U.S. Cl. ....................... 235/492; 235/441

(58) Field of Search ................ 235/375, 441, 235/482, 495, 485, 486, 376, 492, 380; 707/103; 709/228, 235, 229, 237, 226, 302; 439/218, 630

(56) References Cited

U.S. PATENT DOCUMENTS

| | | | | |
|---|---|---|---|---|
| 6,006,987 A | * | 12/1999 | Hoolhorst | 235/375 |
| 6,041,365 A | * | 3/2000 | Kleinerman | 709/302 |
| 6,062,887 A | * | 5/2000 | Schuster et al. | 439/218 |
| 6,241,557 B1 | * | 6/2001 | Reichardt | 439/637 |
| 6,304,454 B1 | * | 10/2001 | Akamatsu et al. | 361/752 |
| 2002/0014528 A1 | * | 2/2002 | Shiue | 235/441 |

FOREIGN PATENT DOCUMENTS

| | | | |
|---|---|---|---|
| JP | 408279024 A | * | 10/1996 |
| JP | 02000332868 A | * | 11/2000 |
| TW | 86209643 | | 6/1997 |

* cited by examiner

*Primary Examiner*—Thien M. Le
(74) *Attorney, Agent, or Firm*—Rabin & Berdo, P.C.

(57) ABSTRACT

A drawable SIM card holder of a mobile phone at least includes: (a) a drawer attached to the protective cover of the mobile phone; (b) an elastomer for bracing and bouncing the SIM card for the convenience of removing the SIM card; (c) a button for fixing the drawer on the protective cover.

12 Claims, 3 Drawing Sheets

DRAWABLE SUBSCRIBER IDENTITY MODULE CARD HOLDER

This application incorporates by reference Taiwanese application Serial No. 89114571, Filed Jul. 20, 2000.

BACKGROUND OF THE INVENTION

1. Field of the Invention

The invention relates in general to a Subscriber Identity Module (SIM) card holder, and more particularly to a drawable SIM card holder of a mobile phone.

2. Description of the Related Art

Subscriber Identity Module (SIM) Card is for a special purpose for a digital mobile phone of Global System for Mobile Communications (GSM). While the GSM system was developed in Europe, the concept derived from the credit card has been integrated into the design of the digital mobile phone for improving on the protection available against pirated use of analog mobile phone. It is unique for the subscriber to have a Personal Identification Number (PIN) of the SIM card for using the mobile phone. The SIM card is a kind of micro-processing chip containing communication network-related information for specially identifying a subscriber, such as the mobile phone number and parameters of communication, and has memory for storing telephone directory or other personal information.

Each subscriber applying for an account from the system proprietor can get a SIM card representing a personal identification number. Thus, the subscriber could take out the SIM card and remove it to another mobile phone for the replacement of mobile phones whenever the mobile phone is upgraded.

Most SIM card contacting devices in the current market secure the SIM card by latching. However, some thorny problems might happen easily, such as falling off of the latch, taking out the SIM card with difficulty or failing to contact with the contact element.

SUMMARY OF THE INVENTION

It is therefore an object of the invention to provide a drawable Subscriber Identity Module (SIM) card holder for the convenience of removing the SIM card. Meanwhile, using a simple mechanical design, such like an elastomer, enables to hold up the SIM card and the SIM card comes into contact with the contact element securely.

The invention achieves the above-identified objects by providing a drawable SIM card holder of a mobile phone, the main feature of the drawable card holder includes a drawer and an elastomer. The drawer for receiving a SIM card is attached to the protective cover of the mobile phone and coupled with the contact element. The elastomer installed in the drawer braces the SIM card when the drawer is in the room and enables the SIM card to pop out of the drawer when the drawer is drawn out of the room. The elastomer makes the plane formed by the SIM card incline with flexible angle for the convenience of removing the SIM card.

The invention achieves the above-identified objects by providing another drawable SIM card holder, which includes a drawer and an elastomer. The drawer further includes a button capable of clasping the button hole for fixing the drawer on the protective cover.

The invention achieves the above-identified objects by providing another drawable SIM card holder, which includes a drawer and an elastomer. The drawer further includes SIM card positions; the protective cover of the mobile phone has a number of ribs. When the SIM card is inserted into the mobile phone, the SIM card can be put in the right position without left or right deviation due to the withstanding of the SIM card positions disposed two-sidedly and without up or down deviation by a pressure of the ribs and a elasticity from the compression of the elastomer. It enables the SIM card to be coupled to the contact element of the printed circuit board.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
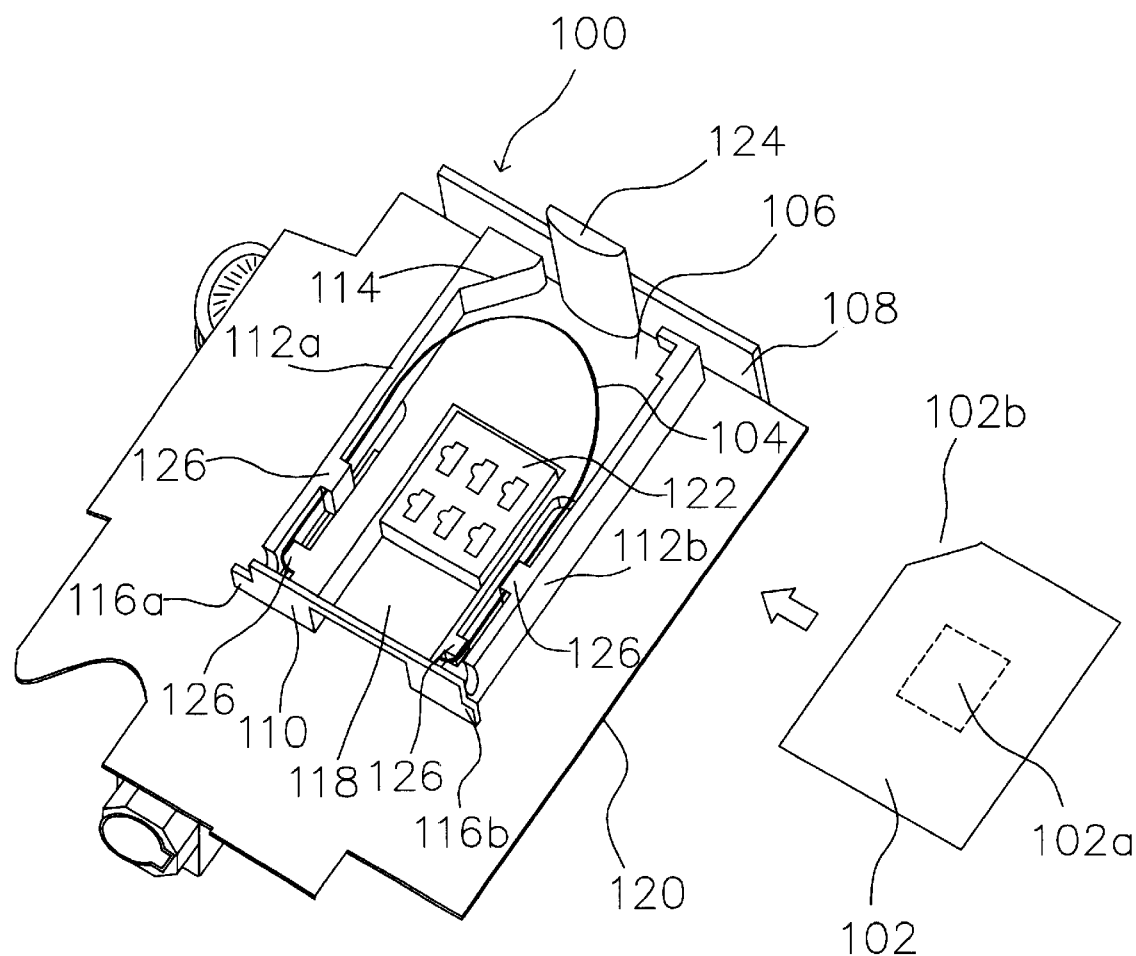
FIG. 1 illustrates an interior structural diagram of a drawable SIM card holder according to a preferred embodiment of the invention.

Referring first to FIG. 1, an interior structural diagram of a drawable SIM card holder according to a preferred embodiment of the invention is illustrated. The drawable SIM card holder according to a preferred embodiment of the invention at least includes a drawer 100 for receiving a SIM card 102 and an elastomer 104. The elastomer 104 installed in the drawer 100 could be a spring wire, spring or leaf spring. Whenever drawing out the drawer 100, the elastomer 104 enables the SIM card 102 to pop out of the drawer 100 for the convenience of removing the SIM card 102.

Moreover, the drawer 100 further includes a bottom 106, front edge 108, rear edge 110, first side edge 112a, second side edge 112b, and bevelling 114. Two ends of the front edge 108 connect one end of the first side edge 112a and one end of the second side edge 112b respectively. Two ends of the rear edge 110 connect another end of the first side edge 112a and another end of the second side edge 112b respectively. The bottom connects the front edge 108, rear edge 110, first side edge 112a and second side edge 112b to construct the drawer 100.

The connection between the first side edge 112a and the front edge 108 further includes a bevelling 114 for mating with the SIM card cutting angle 102b. The bevelling 114 design can prevent the SIM card from being malpositioned and indicate proper SIM insertion and mating.

Two ends of the rear edge 110 of the drawer 100 have a first protruding piece 116a and a second protruding piece 116b. The first protruding piece 116a and second protruding piece 116b protect the drawer 100 from being entirely drawn away.

The bottom 106 of the drawer 100 further includes a contact field 118. The SIM card contact point 102a is coupled with the contact element 122 on the printed circuit board 120 of the mobile phone when the drawer 100 is buckled on the protective cover 200 (as shown in FIG. 2).

The drawable SIM card holder according to the preferred embodiment of the invention further includes a button 124 disposed on the front edge 108 of the drawer 100. In addition, there are several blocks 126 on the first edge 112a, second edge 112b and bottom 106 for fixing the elastomer 104 on the drawer 100. The tangent plane formed by the elastomer 104 relative to the surface of the bottom 106 is an incline with flexible angle.

Figure 2:
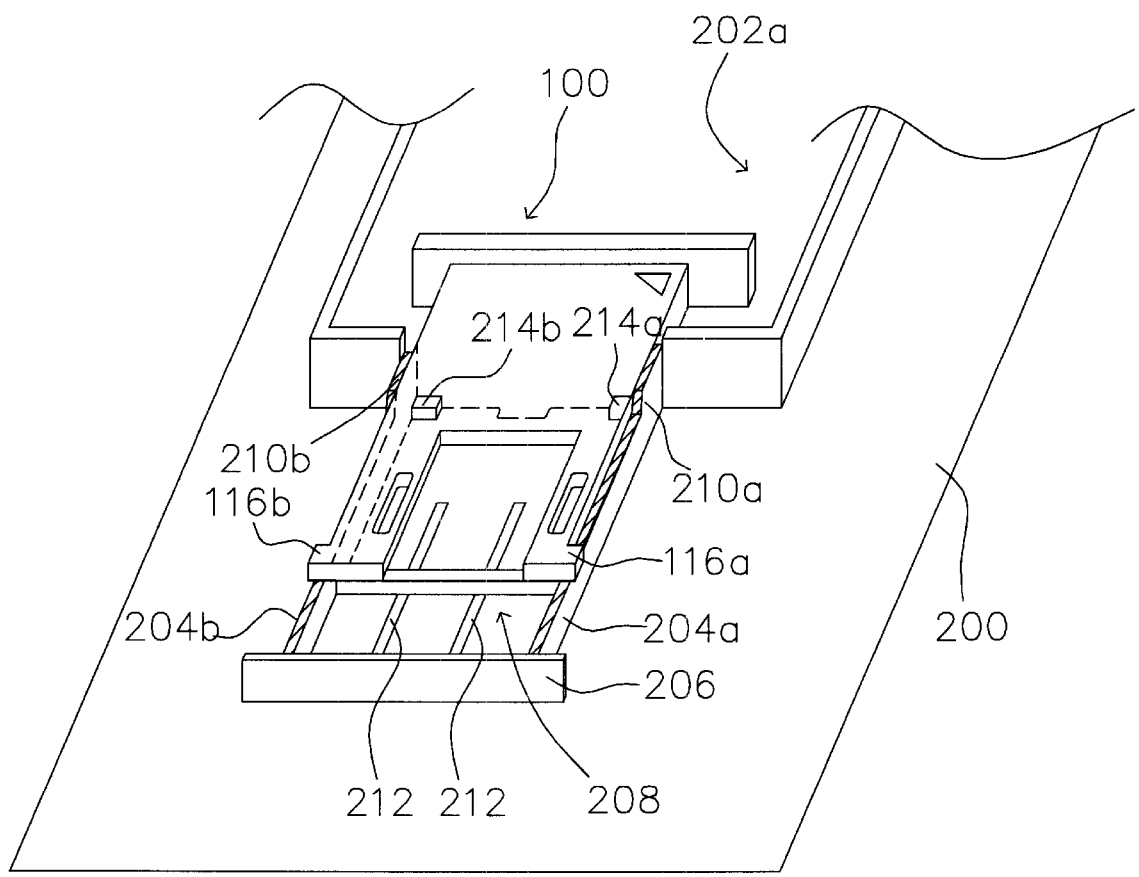
FIG. 2 shows a schematic view of a drawable SIM card holder drawn out from a protective cover according to a preferred embodiment of the invention, wherein the interior of the protective cover is taken as the obverse side.

Referring to FIG. 2, a schematic view of a drawable SIM card holder drawn out from a protective cover according to a preferred embodiment of the invention is shown, wherein the interior of the protective cover is taken as the obverse side. As shown in FIG. 2, the interior side of the protective cover 200 includes the first slide member 204a, second slide member 204b and the rear guard 206. The room 208 inside the protective cover 200 is surrounded with the first slide member 204a, second slide member 204b and the rear guard 206. The drawer 100 can be either positioned in the room 208 exactly or drawn out along the first slide member 204a and second slide member 204b.

The interior side of the protective cover 200a further includes the first guard 210a and second guard 210b, which are disposed on the first slide member 204a and the second slide member 204b respectively near the room for battery cover 202a. Thus, while the drawer 100 is drawn out, the first protruding piece 116a and the second protruding piece 116b of the drawer 100 can protect the drawer 100 from being entirely drawn away by the withstanding of the first guard 210a and a second guard 210b.

Furthermore, the interior side of the protective cover 200 includes the first SIM card position 214a, second SIM card position 214b, which are disposed on the protective cover 200 respectively near two sides of the room for battery cover 202a. Therefore, the SIM card can be put into the drawer 100 in the right position without left or right deviation.

Moreover, the interior side of the protective cover 200 includes a number of ribs, preferably two ribs. When the drawer 100 is buckled on the protective cover 200, the ribs 212 can secure the SIM card 102 from up or down deviation by the pressure of the ribs and the elasticity from the compression of the elastomer and enable the SIM card 102 coupled to the contact element 122 of the printed circuit board 120.

Figure 3:
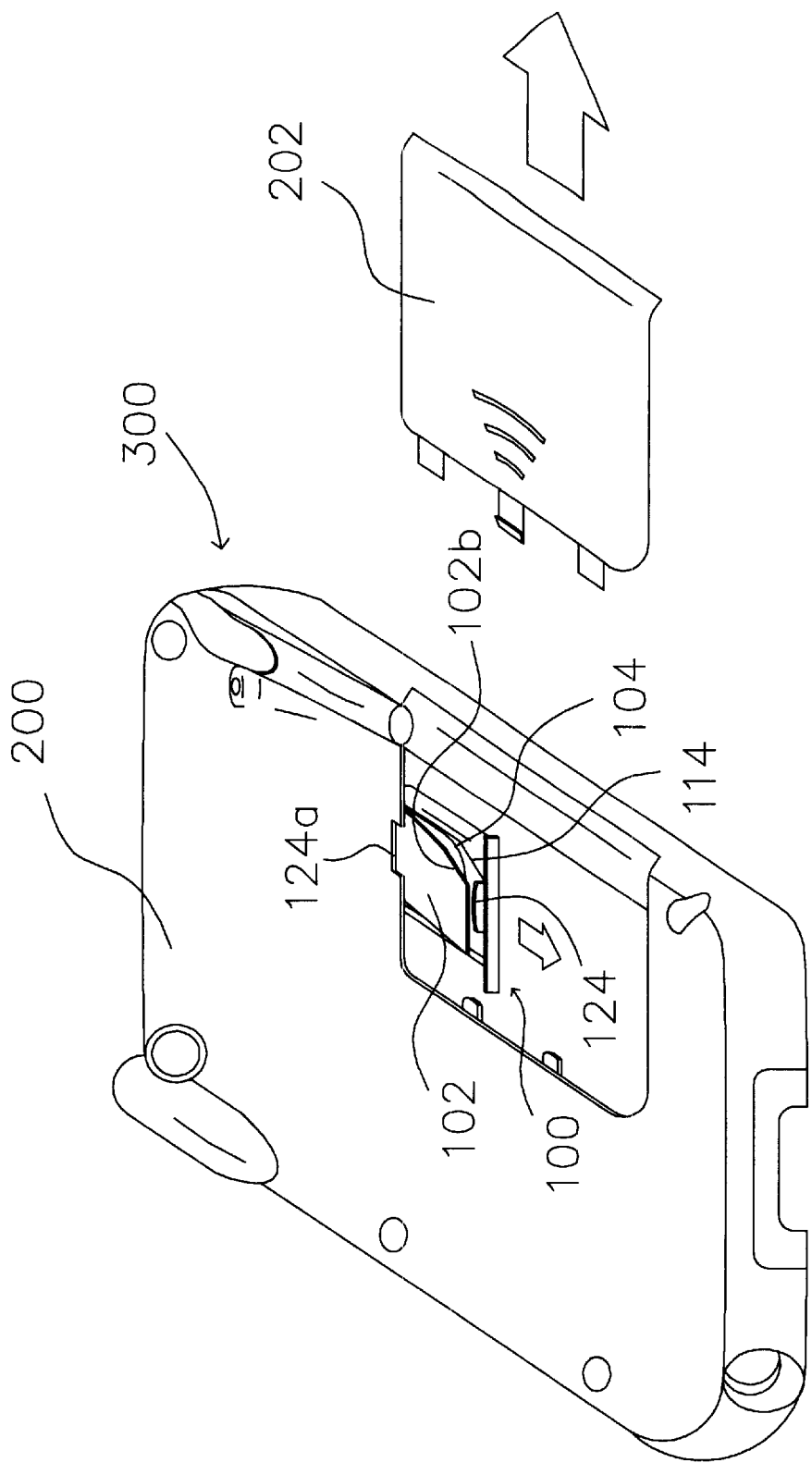
FIG. 3 shows a functional flow diagram of operating a mobile phone with a drawable SIM card holder according to a preferred embodiment of the invention.

Referring to FIG. 3, a functional flow diagram of operating a mobile phone with a drawable SIM card holder according to a preferred embodiment of the invention is shown. After the battery cover 202 of the mobile phone 300 is taken apart from the protective cover 200 by unclasping the button, the drawer 100 is drawn out from the protective cover 200 and the user can replace the SIM card 102. The drawer 100 has a bevelling 114 for mating with the SIM card cutting angle 102b and thus the SIM card 102 can be inserted promptly in the right direction. In the course of insertion, the elastomer 104 can brace the SIM card 102 and make the plane formed by the SIM card 102 an incline with flexible angle relative to the surface of the bottom 106. When the drawer is buckled on the protective cover 2, the button 124 of the drawer 100 clasps the button hole 124a of the protective cover 200 so that the drawer 100 is fixed on the protective cover 200. Hence, the SIM card 102 is properly and successfully inserted into the mobile phone 300 as the compression of the elastomer 104.

The drawable SIM card holder according to the invention applies to not only the mobile phone but also the two-in-one or three-in-one device consisting of the mobile phone and other electric equipment, such as the device with the combination of the Personal Digital Assistant (PDA) and the mobile phone.

The drawable SIM card holder according to the preferred embodiment of the invention, which provides a drawable drawer applied in the mobile phone system for the convenience of removing the SIM card. Meanwhile, using a simple mechanical design of an elastomer enables to hold up the SIM card and the SIM card to come into contact with the contact element securely.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A drawable Subscriber Identity Module (SIM) card holder of a mobile phone, wherein the mobile phone comprises a protective cover having a battery cover; the interior side of the protective cover having a first slide member, a second slide member, a rear guard and a room surrounded by the first slide member, second slide member and rear guard; the SIM card holder comprising:

a drawer for receiving a SIM card, wherein the drawer is slidable into and from the room along the first slide member and second slide member; and an elastomer installed in the drawer such that when the SIM card is disposed thereon while the drawer is in the room, the SIM card pops out of the drawer when the drawer is drawn out of the room.

2. The drawable SIM card holder according to claim 1, wherein the drawer further comprises a bottom, front edge, rear edge, first side edge, and second side edge, wherein two ends of the front edge connect one end of the first side edge and one end of the second side edge respectively, two ends of the rear edge connect another end of the first side edge and another end of the second side edge respectively, and the drawer bottom connects the front edge, rear edge, first side edge and second side edge to construct the drawer.

3. The drawable SIM card holder according to claim 2, wherein the SIM card comprises a SIM card cutting angle and the drawer comprises a bevelling disposed at the connection between the first side edge and the front edge for mating with the SIM card cutting angle and preventing the SIM card from malposition.

4. The drawable SIM card holder according to claim 2, wherein the protective cover of the mobile phone further comprises a button hole; and the drawer further comprises:

a button disposed on the front edge, wherein the button clasps the button hole for fixing the drawer on the protective cover or unclasps the button hole for drawing out the drawer from the protective cover.

5. The drawable SIM card holder according to claim 2, wherein the mobile phone further comprises a printed circuit board having a contact element; and the drawer further comprises:

a contact field on the drawer bottom, the SIM card contact point being coupled with the contact element when the drawer is buckled on the protective cover.

6. The drawable SIM card holder according to claim 1, wherein the interior side of the protective cover further comprises:

a first guard and a second guard, which are disposed on the first slide member and the second slide member respectively near a room for the battery cover, wherein the first guard and the second guard comprise means to protect the drawer from being entirely drawn away.

7. The drawable SIM card holder according to claim 6, wherein two ends of the rear edge of the drawer respectively comprise:
- a first protruding piece and a second protruding piece, wherein the first protruding piece and the second protruding piece comprises means to protect the drawer from being entirely drawn away by the withstanding of the first guard and the second guard while the drawer is drawn out.

8. The drawable SIM card holder according to claim 1, wherein the interior side of the protective cover further comprises:
- a first SIM card position and a second SIM card position, which are respectively disposed near two sides of a room for battery cover for putting the SIM card into the drawer in the right position without left or right deviation.

9. The drawable SIM card holder according to claim 1, wherein the interior side of the protective cover further comprises:
- a plurality of ribs in the room, wherein the ribs comprise means to secure the SIM card from up or down deviation by a pressure of the ribs and a elasticity from the compression of the elastomer and enable the SIM card to be coupled to the contact element of the printed circuit board while the drawer is buckled on the protective cover.

10. The drawable SIM card holder according to claim 1, wherein the elastomer is a spring wire.

11. The drawable SIM card holder according to claim 1, wherein the elastomer is a spring.

12. The drawable SIM card holder according to claim 1, wherein the elastomer is a leaf spring.

* * * * *